United States Patent
Lyschick et al.

(10) Patent No.: US 7,780,108 B2
(45) Date of Patent: Aug. 24, 2010

(54) METHOD FOR WINDING AN ELECTRICAL MACHINE, AND AN AUXILIARY WINDING BODY

(75) Inventors: Eduard Lyschick, Bad Neustadt (DE); Fridolin Mahlmeister, Münnerstadt (DE); Michael Menz, Hohenroth (DE); Norbert Wöhner, Heustreu (DE)

(73) Assignee: Siemens Aktiengesellschaft, München (DE)

( * ) Notice: Subject to any disclaimer, the term of this patent is extended or adjusted under 35 U.S.C. 154(b) by 203 days.

(21) Appl. No.: 12/063,302

(22) PCT Filed: Jul. 26, 2006

(86) PCT No.: PCT/EP2006/064667

§ 371 (c)(1),
(2), (4) Date: Feb. 8, 2008

(87) PCT Pub. No.: WO2007/017380

PCT Pub. Date: Feb. 15, 2007

(65) Prior Publication Data

US 2008/0296427 A1    Dec. 4, 2008

(30) Foreign Application Priority Data

Aug. 8, 2005    (DE) .................. 10 2005 037 375

(51) Int. Cl.
*H02K 15/085* (2006.01)
(52) U.S. Cl. ............... 242/432.6; 242/434.4; 242/434.9
(58) Field of Classification Search ................. 242/432, 242/432.6, 434.4, 434.3, 434.9
See application file for complete search history.

(56) References Cited

U.S. PATENT DOCUMENTS

| | | | | | |
|---|---|---|---|---|---|
| 3,253,792 | A | * | 5/1966 | Brown et al. | 242/432.6 |
| 3,281,084 | A | * | 10/1966 | Lill | 242/432.6 |
| 3,441,226 | A | | 4/1969 | Henry | |
| 3,441,228 | A | * | 4/1969 | Henry | 242/432.6 |
| 3,648,938 | A | * | 3/1972 | Dryburgh | 242/432.6 |
| 3,861,026 | A | * | 1/1975 | Swaim | 29/596 |
| 5,594,984 | A | * | 1/1997 | Kieffer et al. | 29/736 |
| 5,664,317 | A | * | 9/1997 | Ponzio et al. | 29/596 |

(Continued)

FOREIGN PATENT DOCUMENTS

CH    493 137    6/1970

(Continued)

*Primary Examiner*—Evan H Langdon
(74) *Attorney, Agent, or Firm*—Henry M. Feiereisen; Ursula B. Day

(57) ABSTRACT

In a method for winding an electrical machine, a winding auxiliary body is placed on at least one of the end faces of a base body such as to cover at least one of the slot end openings within a circumferential bridging area. Electrical conductors of a winding system are inserted in at least one of the slots whose slot end opening is on one side of the bridging area and passed through an uncovered slot end opening. Subsequently, the electrical conductors are deflected by the winding auxiliary body and guided to a further uncovered one of the slot end openings on another side of the bridging area. After placement of an end plate having an axially projecting separating element and plugging an axial attachment cutout of the winding auxiliary body onto the separating element, the winding auxiliary body is removed, thereby producing a winding element of the winding system.

5 Claims, 4 Drawing Sheets

U.S. PATENT DOCUMENTS

| | | | | |
|---|---|---|---|---|
| 5,845,863 | A | * 12/1998 | Takubo et al. | 242/437.1 |
| 6,702,222 | B2 | * 3/2004 | Meier | 242/432.6 |
| 2009/0173817 | A1 | * 7/2009 | Kojima et al. | 242/432.6 |

FOREIGN PATENT DOCUMENTS

| | | |
|---|---|---|
| DE | 1 170 526 B | 5/1964 |
| DE | 1 257 268 B | 12/1967 |
| FR | 2 569 503 A1 | 2/1986 |
| GB | 1 048 719 A | 11/1966 |
| GB | 1060738 A | 3/1967 |
| GB | 1 149 264 | 4/1969 |
| JP | 60148360 A | 8/1985 |
| JP | 61062348 A | 3/1986 |

* cited by examiner

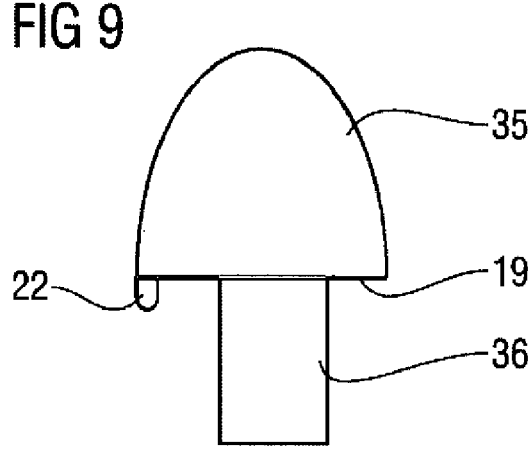
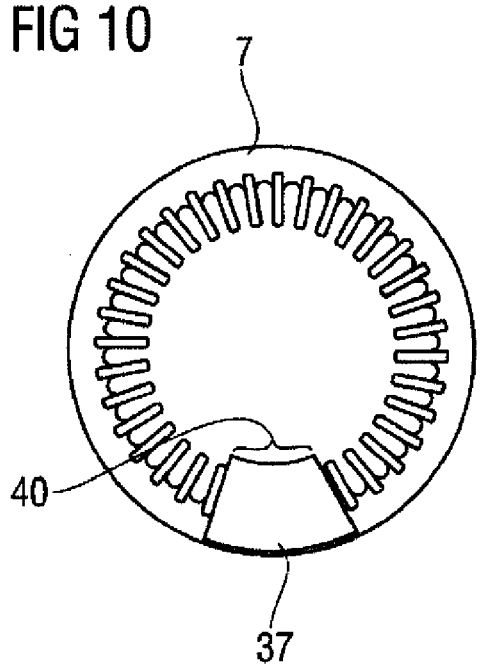
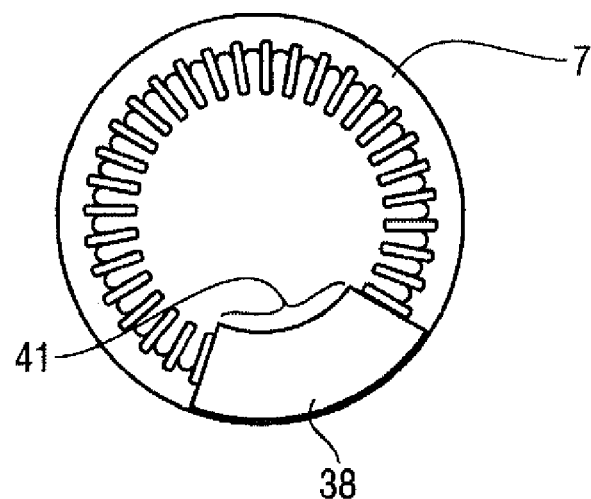
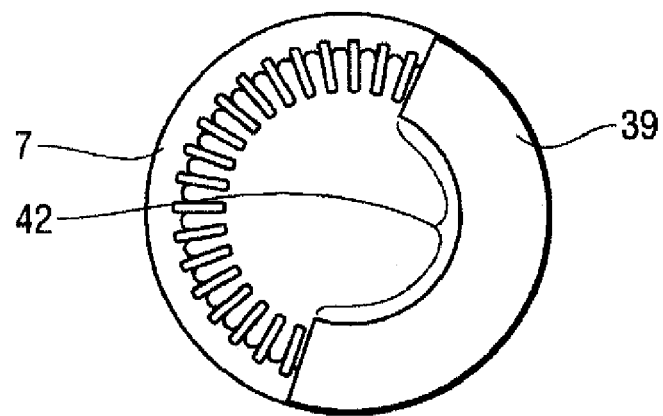

METHOD FOR WINDING AN ELECTRICAL MACHINE, AND AN AUXILIARY WINDING BODY

BACKGROUND OF THE IVENTION

The invention relates to a method for winding an electrical machine, which contains a rotation axis and a base body with two axial end faces and with slots for holding electrical conductors of a winding system, with the slots each having a slot end opening on the end faces. The invention also relates to an auxiliary winding body for carrying out the method.

A method such as this is used, for example, for winding a base body which is in the form of a stator or laminated stator core. Recently, the winding process has been carried out using so-called needle winders, with a winding nozzle of the needle winder inserting an electrical conductor in the interior of a stator bore into one of the slots and moving forwards in the axial direction, that is to say in the direction of the rotation axis. On the end face, the winding nozzle (=needle) is first of all also moved slightly outwards in the axial direction. The laminated stator core is then rotated about the rotation axis until the slot end opening of that slot in which the electrical conductor is passed back in the opposite direction within the stator bore appears at the level of the winding nozzle. The process is carried out in mirror-image form on the opposite end face. This is repeated as appropriate for the desired number of turns, so that end windings are formed on both end faces.

The winding system may have a plurality of winding elements, which are introduced into the laminated stator core successively using the described method. In this case, the deflection path length on the end faces for winding elements which are introduced later is greater than that for the winding elements manufactured first. In consequence, the mean coil lengths of the individual winding elements differ from one another. Furthermore, more material is used for the winding elements which are introduced later, as a result of which the individual winding elements may also have electrical resistance differences.

These undesirable consequences can be compensated for by means of controlled catching elements on both end faces. However, their use is highly complex and slows down the cycle time of the winding process.

Furthermore, the deflection process of the electrical conductor in the area of the end faces can result in a high tensile strength, which can lead to an unacceptable strain and, resulting from this, in a constriction in the cross section of the electrical conductor. Furthermore, the electrical conductor may also be damaged.

SUMMARY OF THE INVENTION

One object of the invention is therefore to specify a method of the type mentioned initially, which can be carried out easily and which allows a high-quality winding to be achieved in the area of the end faces.

This object is achieved according to the invention by a method in which, in order to produce a first winding element of the winding system:
a) an auxiliary winding body is arranged on at least one of the end faces such that it covers at least one of the slot end openings within a bridging area which runs in the circumferential direction,
b) the electrical conductors
b1) are inserted in at least one of the slots (10), whose slot end opening is located on one side of the bridging area and are passed through the uncovered slot end opening,
b2) are deflected by means of the winding auxiliary body on the end face and are passed to a further uncovered one of the slot end openings, which is located on the other side of the bridging area, and
c) the winding auxiliary body is removed again after completion of the first winding element.

The winding auxiliary body that is used for the method according to the invention avoids the difficulties which have occurred until now in conjunction with needle winders in the winding in the end area. The winding auxiliary body is a simple tool which can be fitted to the end faces without any problems before the start of the actual winding process, and can be removed again just as easily after completion. Its use is therefore linked to little technical complexity. In this case, the winding process may relate to a part of the winding or else to the entire winding.

The electrical conductors are deflected on the end faces by means of this advantageous winding auxiliary body. The electrical conductor is in this case guided in particular such that it slides on the surface of the winding auxiliary body, that is to say with a comparatively low coefficient of friction, and in particular while maintaining a predetermined tensile stress. This avoids excess tensile stresses. The electrical conductor is not subject to any undesirable constriction in its cross section and, for example, its electrical insulation is not damaged. The electrical conductor may in this case be guided in the circumferential direction—that is to say around the winding former—and/or at least partially in the axial direction as well—that is to say beyond the winding auxiliary body.

Furthermore, the winding auxiliary body allows controlled arrangement of the individual layers of the electrical conductors, thus resulting in a defined configuration of the end winding on the end face. In particular, this also allows successively introduced winding elements to be produced essentially with the same winding lengths and essentially with the same electrical resistances.

Overall, the use of the winding auxiliary body according to the invention therefore leads to high-precision and high-quality winding. In particular, compared with a winding process without an auxiliary winding body, this results in a reduction in the mean coil length. This leads to an improvement in the electrical operating data of the electrical machine, with less material being used at the same time.

In one advantageous variant, the winding auxiliary body has at least one axial attachment projection by means of which it is inserted into an opening in the base body, for arrangement on the end face. This opening may, in particular, be one of the slot end openings which are bridged by the winding auxiliary body, or else another bore within the base body, for example the stator bore. The attachment projection therefore allows the winding auxiliary body to be arranged directly on the base body. The end windings which are formed in the course of the winding process on the two end faces of the base body then rest directly on the base body. This results in a very short axial physical length and, furthermore, in good thermal coupling between the end windings and the base body.

In a further preferred refinement, an end plate with at least one axially projecting separating element, for example in the form of a separating web, separating pin or finger, is arranged on the end face. The winding auxiliary body has at least one axial attachment cutout, by means of which, for arrangement on the end face, it is plugged onto the separating element, which is provided in particular in the bridging area. The winding auxiliary body which has been positioned in this way protects the separating elements which, in particular, are composed of an insulating plastic material, against bending and/or damage resulting from the tensile stress in the electrical conductors. The winding auxiliary body likewise prevents damage to the electrical conductors resulting from excessive mechanical friction on the separating element.

Furthermore, a first guide element, in particular an electrically insulating guide element which, for example, has a U-profile or an L-profile, can preferably be placed between the end face and the winding auxiliary body in the bridging area, in which first guide element the electrical conductors are located after guidance by means of the winding auxiliary body. After the deflection and guidance of the electrical conductors by means of the winding auxiliary body, they slide into the first guide element. The electrical conductors are laid in this way without any disturbing influence from lateral forces on the guide element. In particular, this prevents undesirable lateral movement of the guide element and a possible adverse effect on the electrical isolation function which could otherwise occur in this way.

The first guide element is preferably fixed in its position by means of the winding auxiliary body during the production of the first winding element. This results in high manufacturing precision. In particular, the electrical isolation between the electrical conductors of adjacent winding elements or between the electrical conductors and the base body is ensured by the fixed-position guide element.

Furthermore, after completion of the first winding element, it is advantageous for a further guide element for holding the electrical conductors of a further winding element to be placed axially adjacent to the first guide element. This makes it possible to arrange winding elements that are stacked axially very close to one another on the end faces of the base body. This results in a compact design with small dimensions in the axial direction.

It is preferable for a further winding auxiliary body to be arranged on the further guide element, by means of which further winding auxiliary bodies the electrical conductors are guided during the production of the further winding element. This essentially results in the same advantages as those already described in conjunction with the first winding auxiliary body used.

A further object of the invention is to specify an auxiliary winding body for carrying out the method as described above, which allows high-quality winding in the area of the end faces.

This object is achieved according to the invention by a winding auxiliary body having a smooth outer wall with rounded outer wall edges and in particular with a rounded surface contour in order to guide electrical conductors such that they largely slide.

The smooth outer wall and the rounded outer wall edges prevent a high tensile stress occurring while the electrical conductors are being guided around the winding auxiliary body. In fact, the guidance process is carried out in a largely sliding form, with a very low coefficient of friction. This avoids unacceptable strain and cross-sectional constrictions resulting from this, as well as damage to the electrical conductor. This results in a very high-quality winding.

In particular, the winding auxiliary body may be produced from a metallic material, for example from aluminum. This allows the smooth outer wall as well as the rounded outer wall edges to be produced without major technical effort. Furthermore, in particular, the winding auxiliary body assumes the shape of a circular arc section. In consequence, it is matched to the typically cylindrical geometry of the base body.

Advantageous refinements of the winding auxiliary body according to the invention result from the features of the claims.

In one advantageous refinement, a lower face, which runs approximately at right angles to the outer wall, of the winding auxiliary body is at least partially in the form of a contact surface for a guide element of the electrical conductors. Interaction between the winding auxiliary body and this guide element leads to particularly advantageous winding of the base body.

Furthermore, it is preferable for the contact surface to be in the form of a depression on the lower face. This allows the first guide element to be fixed in its position, such that it cannot be moved during the winding process. The end windings on the two end faces can thus be produced particularly accurately and, in particular, also predictably and reproducibly. There is no need to provide safety margins, thus also allowing the electrical machine to be designed adequately up to the permissible limits.

Furthermore, it is advantageous for the outer wall of the winding auxiliary body to have a projection which extends beyond the contact surface on the lower face. The electrical wire is passed over this projection, which in particular assumes the form of a guide tab, and then slides into the guide element arranged underneath. This allows the electrical conductors to be laid very precisely and uniformly without a coil of unacceptable height being formed. This, for example, ensures maintenance of air gaps and/or creepage distances that are required from the housing of the electrical machine.

According to two alternative refinements, the winding auxiliary body has attachment means on its lower face. In the first refinement, an axial attachment projection is provided, and extends away from the lower face. In the second refinement, an axial attachment cutout is provided, and extends into the winding auxiliary body, starting from the lower face. In both cases, simple fitting to the end face of the base body is possible. In particular, this temporary mechanical connection can easily be detached again after completion of the winding process.

BRIEF DESCRIPTION OF THE DRAWING

Further features, advantages and details of the invention will become evident from the following description of exemplary embodiments, with reference to the drawing, in which:

FIG. 9 shows one exemplary embodiment of an auxiliary winding body having an attachment projection on its lower face, and FIGS. 10 to 12 show exemplary embodiments of winding auxiliary bodies with different circular arc coverage.

DETAILED DESCRIPTION OF PREFERRED EMBODIMENTS

Mutually corresponding parts are provided with the same reference symbols in FIGS. 1 to 12.

Figure 1:
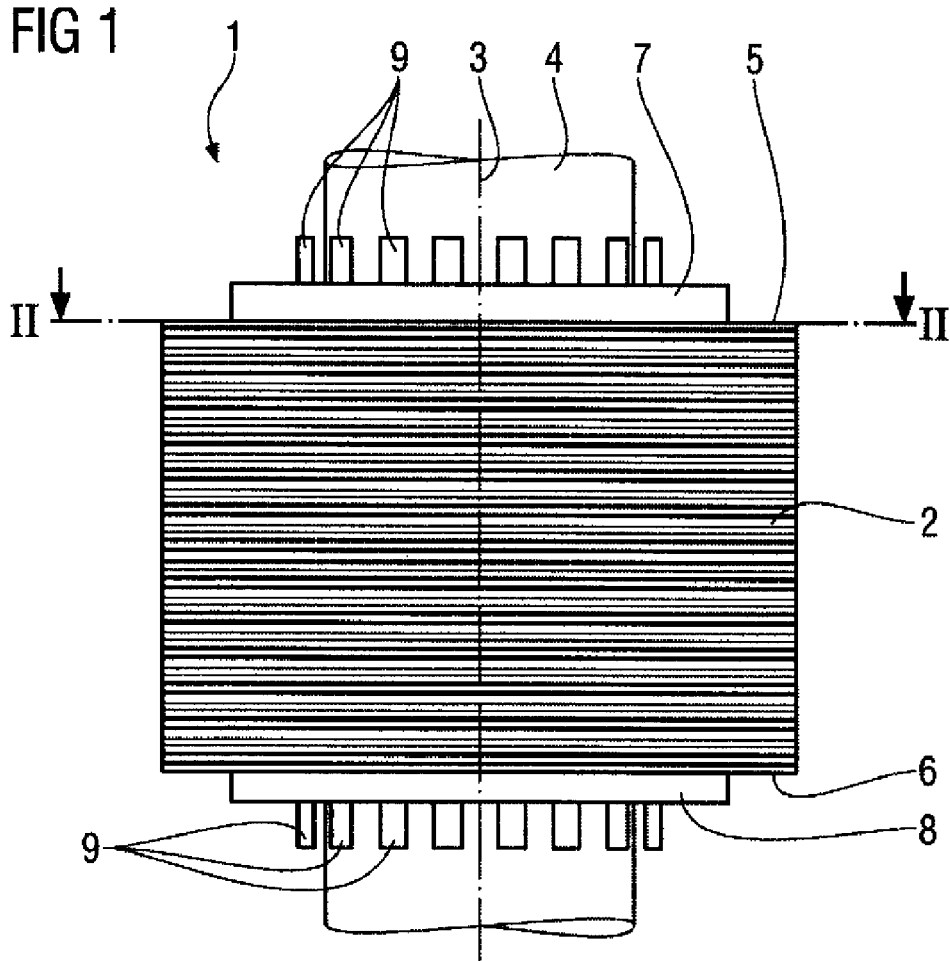
FIG. 1 shows one exemplary embodiment of a base body to be wound for an electrical machine having end plates arranged on the end faces, in the form of a plan view.

FIG. 1 shows one exemplary embodiment of an electrical machine 1, in the form of an electric motor, with a base body 2 to be wound and with a rotor 4 which is mounted such that it can rotate about a rotation axis 3. The base body 2 is part of a stator of the electrical machine 1, and is in the form of a laminated stator core. It has axial end faces 5 and 6, on each of which an electrically insulating end plate 7 and 8, respectively, is arranged. The end plates 7 and 8 have axially projecting separating webs 9, which are arranged distributed uniformly in the circumferential direction.

Figure 2:
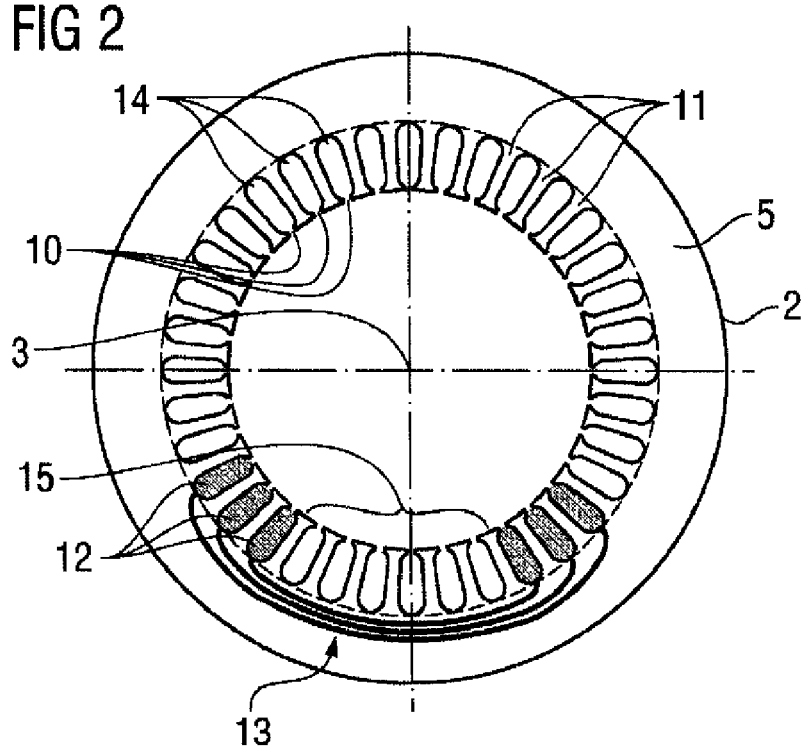
FIG. 2 shows the base body illustrated in FIG. 1, in the form of a cross-sectional illustration.
Figure 3:
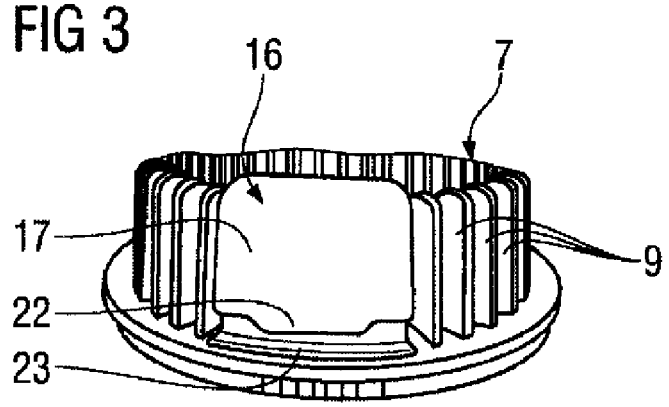
FIGS. 3 and 4 show one exemplary embodiment of a guide element and of an auxiliary winding body which is fitted to the end plate as shown in FIG. 1 during a winding process.

According to the cross-sectional illustration shown in FIG. 2, the base body 2 has a stator inner bore, in which the rotor 4, which is not shown in FIG. 2, is placed. Slots 10 which run axially and are distributed uniformly over the circumference are provided in the base body 2 adjacent to an inner wall of this stator inner bore. If required, the slot profile may be slightly inclined rather than being exactly in the axial direction. Slot webs 11 are arranged between the slots 10.

The insulating end plates 7 and 8 are arranged on the end faces 5 and 6, respectively, such that their separating webs 9 are aligned with the slot webs 11. The numbers of separating webs 9 and slot webs 11 are the same.

Electrical conductors 12 of an electrical winding system 13, which is to be introduced into the base body 2, are placed within the slots 10. In the exemplary embodiment shown in FIG. 2, the base body 2 is shown in a partially wound state. Electrical conductors 12 have been arranged in only some of the slots 10. On the end faces 5 and 6, the slots 10 have slot end openings 14, from which the electrical conductors 12 project, in order to be deflected outside the base body 2 on the end faces 5 and 6 and to be guided to another of the slots 10. This deflection and guidance of the electrical conductors 12 is carried out in the exemplary embodiment shown in FIGS. 1 and 2 by means of the insulating end plates 7 and 8. This deflection and conductor guidance is indicated schematically in FIG. 2.

The end plates 7 and 8 can be used universally. They can be used to produce winding systems 13 for different numbers of poles. High tensile stresses and high friction can occur between the separating webs 9 and the electrical conductors 12 during winding of the base body 2 and of the end plates 7 and 8 with the electrical conductors 12. This can lead on the one hand to bending of and/or damage to the separating webs, and on the other hand to damage to the electrical conductors, for example to their electrical insulation.

In order to prevent these disadvantageous effects during the winding process, the separating webs 9 are covered, and therefore protected, in a bridging area 15 by means of an auxiliary winding body 16, which is shown in FIGS. 3 to 6. The winding auxiliary body 16 is in the form of a winding shoe, and is in the form of a circular arc section. Its outer wall 17 is smooth and has rounded outer wall edges 18. It has a rounded surface contour and, in the exemplary embodiment, is produced from aluminum.

During the winding of the base body 2, the electrical conductors 12 are no longer deflected and guided by means of the separating webs 9 of the end plates 7 and 8, but by means of the winding auxiliary body 16. In order to produce a winding element with a plurality of turns, one winding auxiliary body 16 is in each case arranged on one of the two end faces 5 and 6 such that, within the bridging area 15 which runs in the circumferential direction, it covers the slot end openings 14, which are not intended to be wound during this winding process element. The electrical conductor 12 is inserted in one of the slots 10, whose slot end opening 14 is located on a side of the bridging area 15 pointing in the circumferential direction, and is passed out through the associated uncovered slot end opening 14. It is then deflected on the relevant end face 5 or 6 by means of the winding auxiliary body 16 and is guided to a further uncovered one of the slot end openings 14, which is located on the other side of the bridging area 15, pointing in the circumferential direction, in order there to be inserted into the associated slot 10 and to be guided to the other end face 6 or 5, respectively. The process is repeated in a mirror-image form there, thus resulting in a complete turn. Depending on the intended number of turns, this process which has been described for one turn is repeated. Once this winding process element has been completed, the winding auxiliary bodies 16, which are arranged for assistance on both end faces 5 and 6, are removed again. The described winding process can be carried out in particular automatically by means of a needle winder.

Attachment cutouts 20 are provided on a lower face 19 of the winding auxiliary body 16 and extend into the winding auxiliary body 16, starting from the lower face 19. The attachment cutouts 20 are used to hold the separating webs 9. On each of its two sidewalls which point in the circumferential direction, the winding auxiliary body 16 also has a side cutout 21, by means of which in each case one of the two separating webs 9 which are arranged at the edge of the bridging area 15 are held and protected.

Figure 4:
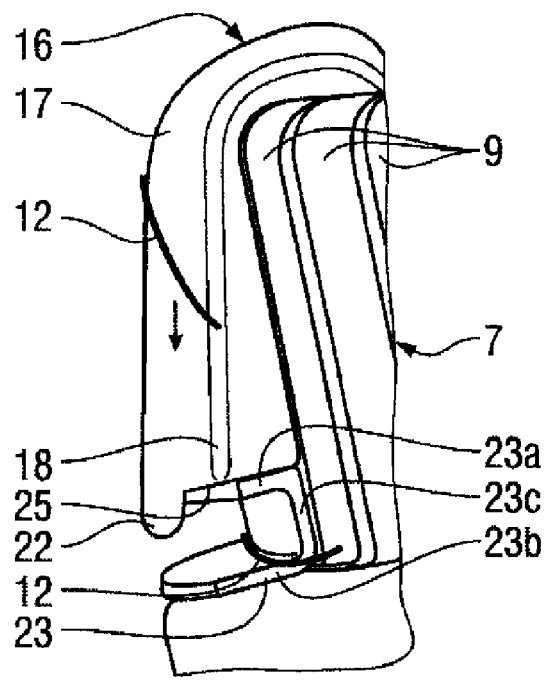
Figure 5:
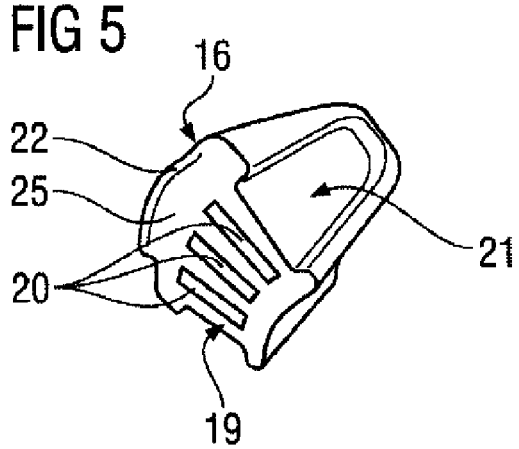
FIG. 5 shows the winding auxiliary body, which has attachment cutouts on its lower face, as shown in FIGS. 3 and 4.
Figure 6:
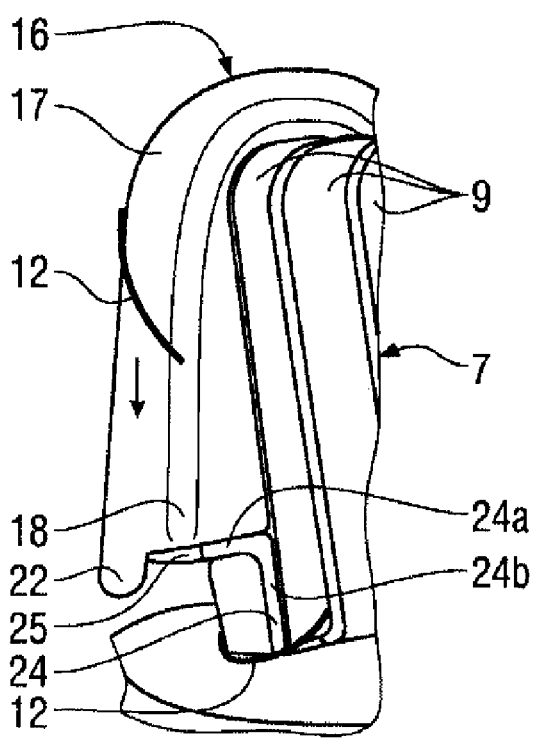
FIG. 6 shows one exemplary embodiment of a further guide element, which is used in conjunction with the winding auxiliary body shown in FIGS. 3 to 5.

The outer wall 17 has a projection 22 which extends beyond the lower face 19 but does not extend beyond the entire circular arc section in the circumferential direction, with this circular arc section covering the rest of the winding auxiliary body 16. Like the smooth outer wall 17, as well, the projection 22 is used for deliberate guidance of the electrical conductors 12. The electrical conductor 12 to be introduced at that time is guided over the smooth outer wall 17 of the winding auxiliary body 16 in conjunction with the deflection in the outer area of the base body 2 and, as indicated by the direction arrows in FIGS. 4 and 6, is pulled downwards. The projection 22 which is provided at the end in this movement direction allows the electrical conductor 12 to slide deliberately into a guide element 23 which is arranged between the winding auxiliary body 16 and the end plate 7 and has a U-profile (FIGS. 3 and 4), or else a guide element 24 with an L-profile (FIG. 6). The U-profiled guide element 23 has two U-limbs 23a and 23b, as well as a U-base 23c. The L-profiled guide element 24 has an L-limb 24a as well as an L-base 24b. Furthermore, both guide elements 23 and 24 are in the form of circular arcs. In the state illustrated in FIGS. 4 and 6, one turn of the electrical conductor 12 has in each case already been produced in the respectively associated guide element 23 or 24, while the next turn is currently being produced, with the electrical conductor 12 being guided along the smooth outer wall 17 of the winding auxiliary body 16.

A contact surface 25 for the guide element 23 or 24 is provided adjacent to the projection 22 on the lower face 19 of the winding auxiliary body 16. The respective guide element 23 or 24 is fixed in its position by means of the contact surface 25 such that no undesirable change occurs in its position during the winding process. The guide elements 23 and 24 have an electrically isolating function, which is completely ensured after the winding process because of this advantageous fixing in position. In the case of other known forms of isolation between the winding elements of the winding system 13, the influence of tensile stresses during the winding process can result in movement of the insulation, and therefore in deterioration of the isolating characteristics. This disadvantage is overcome by the guide element 23 or 24 being fixed in position.

Figure 7:
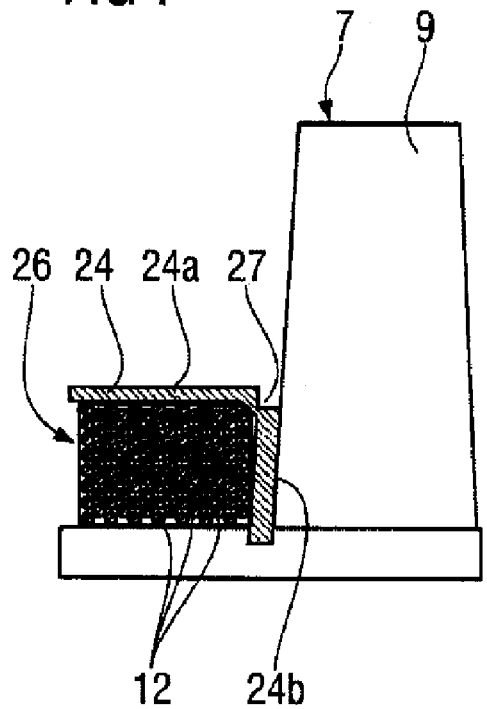
FIG. 7 shows the guide element as shown in FIG. 6, in the wound state.

The winding auxiliary body 16 allows largely uniform winding of the guide elements 23 and 24 with the individual turns of the electrical conductor 12. The dimensions of a winding element 26 that has been produced in this way and is shown in FIG. 7 can be preset in advance by appropriate design of the winding auxiliary body 16 and of the respective guide element 23 or 24. In particular, this results in good space utilization, especially in the radial direction. In other winding methods, which do not make use of the winding auxiliary body 16 and the guide element 23 or 24, the resultant winding elements extend more in the axial direction and less in the radial direction. This results in a structure which is axially longer overall. In contrast, the electrical machine 1 which is wound using the advantageous winding method and using the advantageous guide elements 23 and 24, is distinguished by considerably better space utilization and thus by a shorter axial extent. The advantageous winding method and the advantageous guide elements 23 and 24 may in this case be used either in combination or else as an individual measure, that is to say either the winding method or the guide elements 23 and 24.

Furthermore, the winding system 13 which is produced in this way is also located very close to the base body 2 in the area of the end faces 5 and 6 in which end windings, which are not shown in any more detail, are formed, thus resulting in good thermal coupling. This has an advantageous effect on the dissipation of the heat, which is created in the electrical conductors 12 in the area of the end windings, via the laminated stator core of the base body 2.

Figure 8:
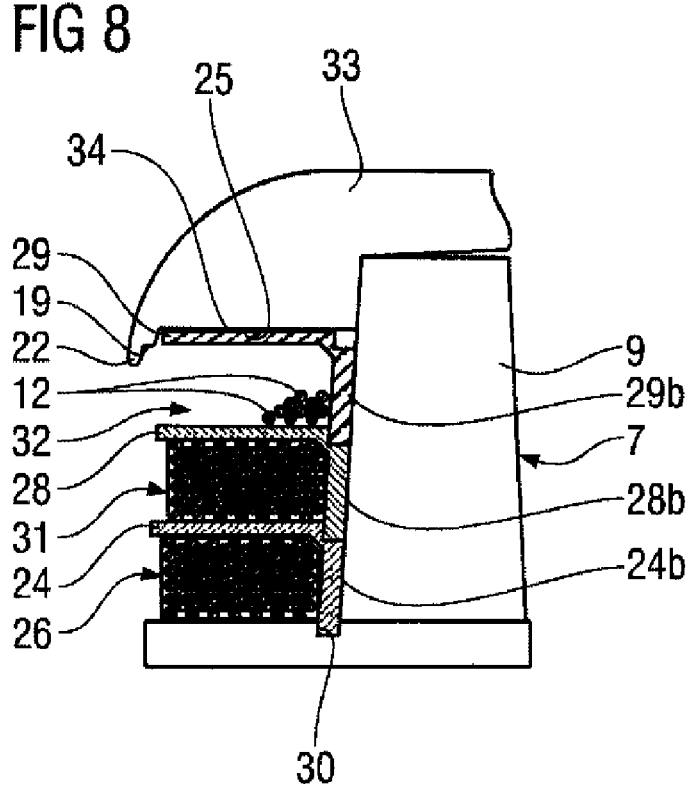
FIG. 8 shows one exemplary embodiment of two guide elements which have already been wound, as shown in FIG. 6, and of a third guide element which is still to be wound, as shown in FIG. 6, and of an auxiliary winding body which has been placed on the end plate as shown in FIG. 1 during a third winding process element.

As shown in the illustration in FIG. 6, the L-profiled guide element 24 has a recess 27 in the outer area of the bent edge between the L-limb 24a and the L-base 24b, in which recess 27 an L-base 28b of a further L-profiled guide element 28 can engage. This makes it possible to produce a plurality of guide elements 24 and 28 which are fixed in position and are stacked in the axial direction. By way of example, FIG. 8 shows one exemplary embodiment with three guide elements 24, 28 and 29 which have been stacked adjacent to one another. In this case, the L-bases 28b and 29b of the respective guide elements 28 and 29 have been fixed in the recess 27 in the respective guide element 24 or 28 located underneath, and the L-base 24b of the lowest guide element 24 has been fixed in an analogously formed recess 30 in the end plate 7.

The exemplary embodiment shown in FIG. 8 shows a state in which the guide elements 24 and 28 have already been completely wound with the winding element 26 and with a winding element 31, respectively. In contrast, the third guide element 29 is currently being wound with the electrical conductors 12 of a further winding element 32.

The electrical conductors 12 are guided by means of an auxiliary winding body 33 which is placed on the separating webs 9 of the end plate 7. In contrast to the winding auxiliary body 16, its coverage width is, however, matched to the longer size in the axial direction of the stack structure formed by the three guide elements 24, 28 and 29. Furthermore, the contact surface 25 for the third guide element 29 is formed by means of a depression 34 on the lower face 19 of the winding auxiliary body 33. This results in the third guide element 29 being fixed in position very well.

FIG. 9 shows a further exemplary embodiment of an auxiliary winding body 35. In contrast to the winding auxiliary bodies 16 and 33, the winding auxiliary body 35 has at least one attachment projection 36, instead of the attachment cutouts 20, on its lower face 19, which attachment projection 36 extends axially downwards away from the lower face 19 and is intended to engage in one of the slots 10 in the base body 2. Throughout the duration of the winding process, the winding auxiliary body 35 is therefore plugged directly onto the base body 2. There is no need for an end plate 7 or 8, as in the case of the exemplary embodiments described above.

FIGS. 10 to 12 show further exemplary embodiments of winding auxiliary bodies 37, 38 and 39, respectively, which are used in conjunction with the end plate 7 or 8 during the winding process. They differ in the size of the circular arc section that is in each case covered. The winding auxiliary bodies 37 to 39 are each intended for different embodiments of the electrical machine 1. In particular, winding systems 13 with different numbers of poles can be produced in this way.

The winding auxiliary bodies 37 to 39 each have a different respective coverage area 40, 41 or 42. A different number of slot end openings 14 are in each case covered and are bridged for guidance of the electrical conductor 12. The guide elements which are in each case also used—although this cannot be seen in FIGS. 10 to 12—cover the same circular arc section as the winding auxiliary bodies 37 to 39.

The use of the winding auxiliary bodies 16, 33, 35, 37, 38 or 39 and in particular of the guide elements 23, 24, 28 or 29, as well, results in the winding system 13 having an exact shape in the area of the end faces 5 and 6, that is to say in the end windings having an exact shape. In particular, this makes it possible to produce end windings which are comparatively long radially and comparatively short axially. In particular, the radial space is used virtually entirely, as far as the outer circumference of the base body 2. This good spatial utilization in the radial direction results in shortening in the axial direction, so that other components of the electrical machine 1, such as the housing and/or the end shield can be axially shortened. This reduces the use of material. Furthermore, the electrical operating data of the electrical machine is improved. For example, this results in an efficiency improvement, because of the reduced copper losses.

Furthermore, the use of the winding auxiliary bodies 16, 33, 35, 37, 38 or 39 and in particular of the guide elements 23, 24, 28 or 29 as well, allows a comparable configuration of the various winding elements 26, 31 and 32 of the winding system 13. In particular, these winding elements 26, 31 and 32 have virtually the same mean coil length, or a mean coil length which is at least very similar, as well as an essentially identical electrical resistance.

What is claimed is:

1. A method for winding an electrical machine having a base body with slots separated by slot webs for holding electrical conductors of a winding system, each slot having a slot end opening on axial end faces of the base body, said method comprising the steps of:

placing a winding auxiliary body on at least one of the end faces of the base body such as to cover at least one of the slot end openings within a circumferential bridging area;

inserting electrical conductors of the winding system in at least one of the slots whose slot end opening is located on one side of the bridging area, passing the electrical conductors through an uncovered slot end opening;

deflecting the electrical conductors by means of the winding auxiliary body on the end face to guide the electric conductors to a further uncovered one of the slot end openings on another side of the bridging area;

arranging on the end face an end plate having a plurality of axially projecting separating elements, wherein the axially projecting separating elements are aligned with the slot webs;

plugging an axial attachment cutout of the winding auxiliary body onto a corresponding one of the separating elements; and removing the winding auxiliary body, thereby producing a first winding element of the winding system.

2. The method of claim 1, further comprising the step of placing a first guide element between the end face and the winding auxiliary body in the bridging area for accepting the electrical conductors after being guided by the winding auxiliary body.

3. The method of claim 2, wherein the first guide element is fixed in place by the winding auxiliary body during production of the first winding element.

4. The method of claim 2, further comprising, after the removing step, the step of placing a second guide element axially adjacent to the first guide element to hold the electrical conductors of a second winding element of the winding system.

5. The method of claim 4, further comprising the step of arranging a second winding auxiliary body on the second guide element for guiding the electrical conductors during production of the second winding element.

* * * * *

UNITED STATES PATENT AND TRADEMARK OFFICE
CERTIFICATE OF CORRECTION

Page 1 of 1

PATENT NO. : 7,780,108 B2
APPLICATION NO. : 12/063302
DATED : August 24, 2010
INVENTOR(S) : Eduard Lyachick et al.

It is certified that error appears in the above-identified patent and that said Letters Patent is hereby corrected as shown below:

On the title page,

(56) Cited References

U.S. PATENT DOCUMENTS

Delete line 3: "3,441,226   4/1969   Henry".

Signed and Sealed this
Eighteenth Day of September, 2012

David J. Kappos
*Director of the United States Patent and Trademark Office*